(12) United States Patent
Stoia et al.

(10) Patent No.: US 12,744,877 B2
(45) Date of Patent: Sep. 22, 2026

(54) LINE OF SIGHT DISPLAY FOR AUGMENTED REALITY

(71) Applicant: Microchip Technology Incorporated, Chandler, AZ (US)

(72) Inventors: Valentin Stoia, Bucharest (RO); Bomy Chen, Newark, CA (US)

(73) Assignee: Microchip Technology Incorporated, Chandler, AZ (US)

( * ) Notice: Subject to any disclaimer, the term of this patent is extended or adjusted under 35 U.S.C. 154(b) by 0 days.

(21) Appl. No.: 19/024,987

(22) Filed: Jan. 16, 2025

(65) Prior Publication Data

US 2026/0039784 A1 Feb. 5, 2026

Related U.S. Application Data

(60) Provisional application No. 63/677,946, filed on Jul. 31, 2024.

(51) Int. Cl.

| | |
|---|---|
| ***G06T 15/20*** | (2011.01) |
| ***G01S 5/02*** | (2010.01) |
| ***G06F 3/01*** | (2006.01) |
| ***H04N 13/344*** | (2018.01) |
| ***H04N 13/383*** | (2018.01) |

(52) U.S. Cl.

CPC ....... *H04N 13/383* (2018.05); *G01S 5/02216* (2020.05); *G01S 5/0284* (2013.01); *G06F 3/013* (2013.01); *H04N 13/344* (2018.05)

(58) Field of Classification Search

CPC .... G01S 5/02216; G01S 5/0284; G06F 3/013; H04N 13/383; H04N 13/344

See application file for complete search history.

(56) References Cited

U.S. PATENT DOCUMENTS

| | | | | |
|---|---|---|---|---|
| 10,396,858 | B2 * | 8/2019 | Greene | H02J 50/10 |
| 10,495,884 | B2 * | 12/2019 | Benesh | G02B 27/0172 |
| 11,896,115 | B2 * | 2/2024 | de Jong | A45C 13/30 |
| 12,039,098 | B2 * | 7/2024 | Lee | G01S 5/02 |
| 12,174,394 | B2 * | 12/2024 | Kim | G02B 27/017 |

(Continued)

FOREIGN PATENT DOCUMENTS

| | | | |
|---|---|---|---|
| CN | 116753977 A | 9/2023 | B60R 1/24 |

OTHER PUBLICATIONS

International Search Report and Written Opinion, Application No. PCT/US2025/014101, 14 pages, Apr. 23, 2025.

*Primary Examiner* — Philip P. Dang

(74) *Attorney, Agent, or Firm* — SLAYDEN GRUBERT BEARD PLLC

(57) ABSTRACT

Systems and methods track a user's line-of-sight relative to objects through a transparent LCD display to provide information about the objects to be displayed on the display proximate the line-of-sight between the object being viewed and the user's head to create an augmented reality environment for the user. A method comprising: determining a position of an object; determining a position of a transparent display; determining a line-of-sight extending between a user's eye and the object through the transparent display; determining where the line-of-sight intersects the transparent display; and displaying object information corresponding to the object via the transparent display proximate where the line-of-sight intersects the transparent display.

20 Claims, 6 Drawing Sheets

(56) References Cited

U.S. PATENT DOCUMENTS

| | | | | |
|---|---|---|---|---|
| 2013/0009863 | A1 | 1/2013 | Noda | 345/156 |
| 2013/0265232 | A1 | 10/2013 | Yun et al. | 345/158 |
| 2017/0323160 | A1 | 11/2017 | Porsch | |
| 2023/0316634 | A1* | 10/2023 | Chiu | G06F 3/011 345/156 |
| 2024/0005827 | A1* | 1/2024 | Nagata | G06F 3/013 |
| 2024/0305330 | A1* | 9/2024 | Matsimanis | G02B 27/017 |
| 2025/0245944 | A1* | 7/2025 | Mcdavitt | G06F 3/013 |

* cited by examiner 450
450
450

LINE OF SIGHT DISPLAY FOR AUGMENTED REALITY

RELATED PATENT APPLICATION

This application claims priority to commonly owned U.S. Provisional Patent Application No. 63/677,946 filed Jul. 31, 2024, the entire contents of which are hereby incorporated by reference for all purposes.

TECHNICAL FIELD

The present disclosure relates to line-of-sight display for augmented reality.

BACKGROUND

Augmented reality (AR) may be used to provide additional information to a user about an environment or objects in an environment around a user. One example use of AR includes AR glasses that are worn by a user and include a transparent screen used to overlay information on items of interest in the user's environment. The information may be either projected onto a transparent screen or may displayed on a transparent LCD screen. For example, AR glasses may indicate the name and other information about a mountain or other landmark within the user's field-of-view. The AR glasses include a camera pointed in the direction that a wearer of the glasses would normally be looking, wherein the camera's field-of-view may be considered within the user's field-of-view when the user is wearing the AR glasses.

Another example includes handheld computing devices running an AR application. The user may hold the handheld computing device up and point a rear-facing camera of the handheld computing device in different directions. The handheld computing device then displays the image from the camera on a display screen of the handheld computing device and includes additional information about points of interest in the field-of-view of the handheld computing device's camera.

Rather than tracking a user's eyes or head position to determine a user's field-of-view, current AR systems include one or more cameras to determine what the user is looking at. For example, AR glasses include a camera pointed in the direction that a wearer of the glasses would normally be looking. As another example, AR applications for handheld computing devices utilize a camera of the handheld computing device pointed in the direction the user is looking. In addition to being expensive and energy intensive, this may also implement privacy concerns for other people in proximity to the user.

There is a need for systems to track a user's line-of-sight relative to objects through a transparent LCD display to provide information about the objects to be displayed on the display proximate the line-of-sight between the object being viewed and the user's head to create an augmented reality environment for the user.

SUMMARY

According to aspects, there is provided systems and methods to track a user's line-of-sight relative to objects through a transparent LCD display to provide information about the objects to be displayed on the display proximate the line-of-sight between the object being viewed and the user's head to create an augmented reality environment for the user According to an aspect, there is provided a method comprising: determining a position of an object; determining a position of a transparent display; determining a line-of-sight extending between a user's eye and the object through the transparent display; determining where the line-of-sight intersects the transparent display; and displaying object information corresponding to the object via the transparent display proximate where the line-of-sight intersects the transparent display.

An aspect provides a method as in the preceding paragraph, wherein determining a position of an object comprises analyzing ultra-wideband radio pulses between a ultra-wideband tag associated with the object and a plurality of ultra-wideband anchors to assign coordinates of the ultra-wideband tag associated with the object within a three-dimensional coordinate system.

An aspect provides a method as in one of the preceding two paragraphs, wherein determining a position of a transparent display comprises analyzing ultra-wideband radio pulses between an ultra-wideband tag associated with the transparent display and a plurality of ultra-wideband anchors to assign coordinates of the ultra-wideband tag associated with the transparent display within a three-dimensional coordinate system.

An aspect provides a method as in one of the preceding three paragraphs, comprising determining a position of the user's eye.

An aspect provides a method as in one of the preceding four paragraphs, wherein determining a position of the user's eye comprises analyzing ultra-wideband radio pulses between a ultra-wideband tag associated with the user's eye and a plurality of ultra-wideband anchors to assign coordinates of the ultra-wideband tag associated with the user's eye within a three-dimensional coordinate system.

An aspect provides a method as in one of the preceding five paragraphs, wherein determining a position of the user's eye comprises determining the user's eye position relative to the transparent display.

An aspect provides a method as in one of the preceding six paragraphs, comprising determining a direction the user's head is facing.

An aspect provides a method as in one of the preceding seven paragraphs, wherein determining a line-of-sight comprises: assigning coordinates to the object within a three-dimensional coordinate system; assigning coordinates to the user's eye within a three-dimensional coordinate system; and extending the line-of-sight between the coordinates assigned to the object and the coordinates assigned to the user's eye.

According to an aspect, there is provided a system comprising: a tag associated with a position of an object to transmit a tag location radio pulses; a line-of-sight locator associated with a user's eye to transmit a line-of-sight location radio pulses; a transparent display to display object information corresponding to the object, wherein the transparent display is positioned between the tag and the line-of-sight locator; an anchor to receive the tag location radio pulses and the line-of-sight location radio pulses; and a logic circuit in communication with the transparent display and the anchor configured to: determine a line-of-sight extending between the user's eye and the object through the transparent display; determine where the line-of-sight intersects the transparent display; and instruct the transparent display to display the object information proximate where the line-of-sight intersects the transparent display.

An aspect provides a system as in the preceding paragraph, wherein the tag comprises a ultra-wideband transmitter.

An aspect provides a system as in one of the preceding two paragraphs, wherein the line-of-sight locator comprises a ultra-wideband transmitter.

An aspect provides a system as in one of the preceding three paragraphs, wherein the anchor comprises an ultra-wideband receiver.

An aspect provides a system as in one of the preceding four paragraphs, wherein the logic circuit is to assign coordinates to the tag and the line-of-sight locator, respectively, within a three-dimensional coordinate system.

An aspect provides a system as in one of the preceding five paragraphs, wherein the transparent display is wearable by the user.

An aspect provides a system as in one of the preceding six paragraphs, wherein the line-of-sight locator is wearable by the user.

An aspect provides a system as in one of the preceding seven paragraphs, wherein the line-of-sight locator comprises first and second wearable ultra-wideband devices to transmit first and second line-of-sight location radio pulses, respectively, wherein the anchor is to receive the first and second line-of-sight location radio pulses; and wherein the logic circuit is configured to determine a direction the user's head is facing.

An aspect provides a system as in one of the preceding eight paragraphs, comprising a handheld computing device to communicate with the logic circuit, wherein the handheld computing device communicates information related to the object for the logic circuit to instruct the transparent display to display.

According to an aspect, there is provided a logic circuit configured to: process a location radio pulses of a tag associated with a position of an object; process a line-of-sight location radio pulses of a line-of-sight locator associated with a user's eye; determine a line-of-sight extending between the user's eye and the object through a transparent display positioned between the tag and the line-of-sight locator; determine where the line-of-sight intersects the transparent display; and instruct the transparent display to display the object information corresponding to the object proximate where the line-of-sight intersects the transparent display.

An aspect provides a logic circuit as in the preceding paragraph, wherein the logic circuit is configured to assign coordinates to the object and the line-of-sight locator, respectively, within a three-dimensional coordinate system.

An aspect provides a logic circuit as in one of the preceding two paragraphs, wherein the logic circuit is configured to: extend the line-of-sight between the coordinates assigned to the object and the coordinates assigned to the user's eye, within the three-dimensional coordinate system; and determine where the line-of-sight intersects the transparent display by assigning coordinates to where the line-of-sight intersects the transparent display, within the three-dimensional coordinate system.

BRIEF DESCRIPTION OF THE DRAWINGS

The figures illustrate aspects of line-of-sight display for augmented reality.

Figure 1:
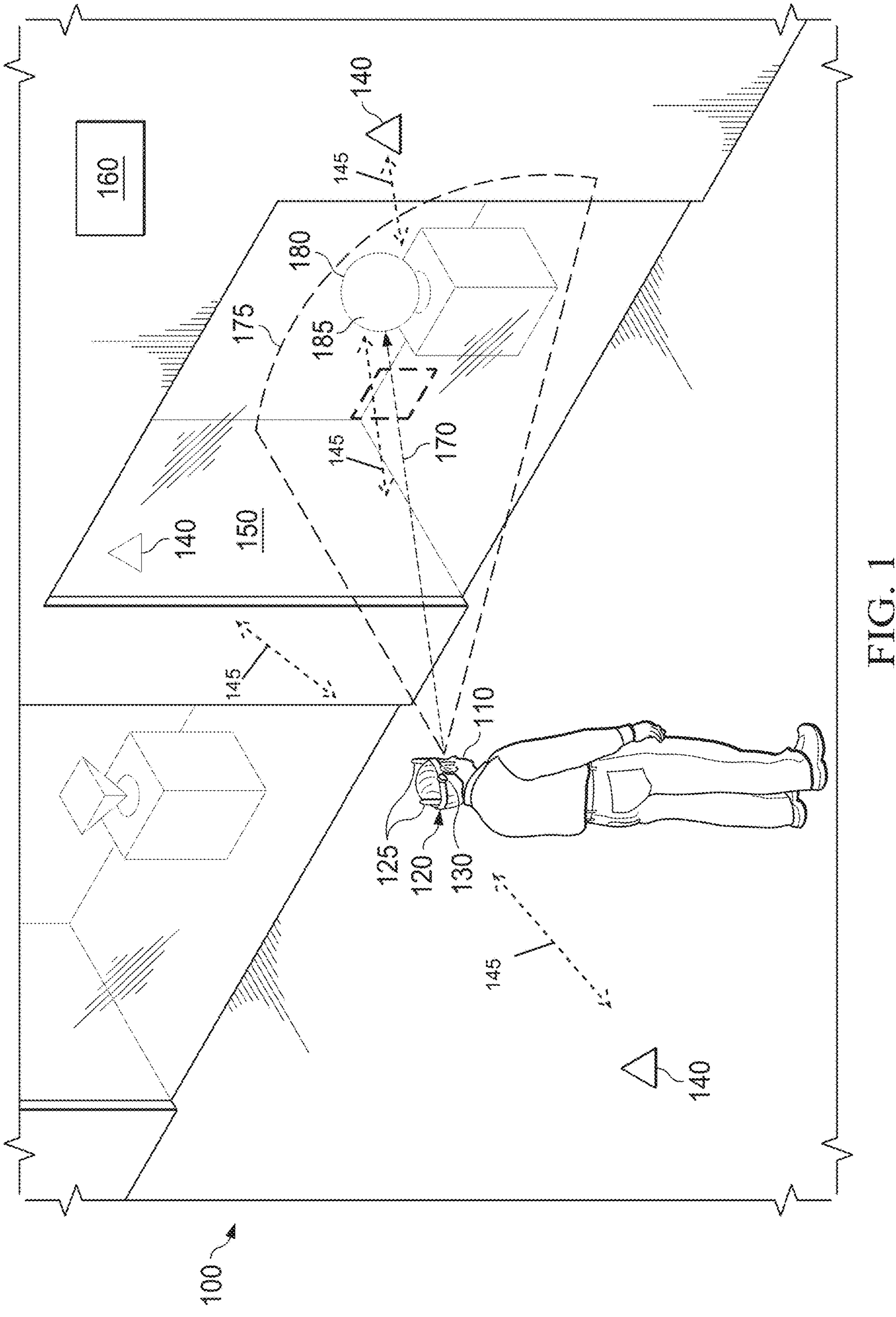
FIG. 1 shows a block diagram of an example line-of-sight display system.

The reference number for any illustrated element that appears in multiple different figures has the same meaning across the multiple figures, and the mention or discussion herein of any illustrated element in the context of any particular figure also applies to each other figure, if any, in which that same illustrated element is shown.

DESCRIPTION

Many user environments already include transparent glass windows that could be used to display information projected thereon, or the windows may be replaced with a transparent display such as a transparent LCD display. Examples may include automobiles, display windows in a shopping area, or glass panes in a museum, without limitation. In some situations, there may be multiple people in the same environment (e.g., automobile, shopping area, museum, restaurant, without limitation) and they may be looking at different things or objects. By determining the relative position and orientation of a user's head in a three-dimensional (three-dimensional) space, a line-of-sight representing the direction of view for the user can be determined. Using the location of the user and the line-of-sight, information about the object of potential interest to the user may be displayed on the transparent glass window proximate the line-of-sight between the object being viewed and the user's head to create an augmented reality environment for the user.

Ultra-wideband (UWB) positioning is one example of a technology that may be used to track the position of objects in a three-dimensional space. UWB positioning transmits short radio pulses across a wide frequency band so that devices may measure the time it takes for a signal to travel between the devices. UWB devices, which utilize a bandwidth of >500 MHz or 20% of the center frequency, may be used to identify a position of an object using a receiver that is synchronized with a transmitter to determine time separations between pulses in a transmit signal and pulses in a receive signal. Due to its use of relatively short pulses, UWB may enable relatively precise distance and localization detection. UWB devices can be used to accurately track the position of an object within a three-dimensional space. UWB positioning calculates the distance between devices with high accuracy and enables location tracking of objects based on the "time of flight" principle using multiple reference points (UWB anchors) to triangulate the position of an object (tagged with a UWB tag) through either of two processes called Time Difference of Arrival (TDoA) and Two-Way Ranging (TWR).

TDoA utilizes UWB anchors having sensors that are deployed in fixed positions in an indoor space. The sensors of the anchors locate transmitting UWB tracking tags associated with objects within the indoor space. The fixed anchors have synchronized clocks and the UW tags transmit signals in regular intervals. These signals are received and time-stamped by the anchors. All the time-stamped data is then sent to a central processing unit that uses a location engine to analyze the differences in arrival times at the UWB anchors and uses multilateration to calculate the UWB tags' coordinates within the indoor space.

TWR uses two-way communication between two transceivers to sense the distance between them. With TWR, two transceivers range with each other to determine the distance. The time it takes a signal to travel between the transceivers is multiplied by the speed of light and used to determine their relative positions. TWR can be used by fixed UWB anchors and UWB tags, however the TWR process may use one ranging partner to locate the device at a time.

FIG. 1 provides an illustration of an example line-of-sight display system 100. Line of sight display system 100 may include a wearable line-of-sight locator 120. The wearable line-of-sight locator 120 may include one or more UWB tags 125. Wearable line-of-sight locator 120 may be fitted on the user's head 110 such that it moves and rotates with user's head 110 and remains in the same position on user's head 110. In some examples wearable line-of-sight locator 120 may be similar to an earbud that is wearable in or on the ear of a user. In other examples, wearable line-of-sight locator 120 may be similar to a hat or a pair of glasses.

Wearable line-of-sight locator 120 may utilize technologies to determine the relative position and orientation of the user's head 110 without the user having to wear or hold a camera. In some examples, wearable line-of-sight locator 120 may include one or more UWB tags 125. In examples with multiple UWB tags 125, a first UWB transceiver may be positioned toward the back of the user's head 110 and a second UWB transceiver may be positioned toward the front of the user's head 110 with a determined spacing between the first and second UWB transceivers that is larger than the minimum resolution of UWB technologies. Line of sight display system 100 may be calibrated with the user's head 110 facing straight ahead. In this manner, the position and rotation of the user's head 110 may be determined by changes in the relative positions of the first and second UWB transceivers. In some examples, a wearable line-of-sight locator 120 may include one or more additional sensors 130 to determine the orientation the user's head 110. For example, tilt or orientation sensors may be used. In some examples, gyroscopic sensors may be used. In some examples, accelerometers which measure the force of gravity acting on them through internal mechanisms with a suspended mass may be used, wherein the mass moves relative to the housing to cause a change in the spring tension which is translated into an electrical signal indicating housing orientation. The one or more additional sensors 130 may be calibrated with the user's head 110 facing straight ahead and then used to determine the rotation of user's head 110.

Line of sight display system 100 may include multiple fixed UWB anchors 140 within a three-dimensional space behind and in front of a screen or display 150. Examples of such three-dimensional spaces may include a museum, a vehicle, a zoo, without limitation. Line of sight display system 100 may include an augmented reality (AR) display, such as transparent display 150. Examples of transparent display 150 may include transparent glass upon which information may be projected, similar to the technology used for head up display (HUD) in vehicles. Examples of transparent display 150 may include a transparent LCD display that can display information in some portions while remaining transparent in other portions. Examples of transparent display 150 may include a portable transparent LCD display that may be folded or rolled for storage. Examples of transparent display 150 may include a cathode ray tube (CRT) to generate an image on a phosphor screen, or transparent phosphors on a transparent screen that react when a laser shines on it.

FIG. 1 illustrates an example use of line-of-sight display system 100 with reference to a three-dimensional space in the form of a museum, without limitation. The museum may include a number of objects 180 in fixed positions within the museum's exhibits. The objects 180 may be located by UWB tags 185, wherein a UWB tag 185 is associated with an object 180. The museum may include a number of transparent displays 150, e.g., panes of glass separating the museum users from the objects 180 in the exhibits. The museum may include a number of UWB anchors 140 at fixed and determined positions within the museum's three-dimensional space both in front of and behind the transparent display 150. The museum may include one or more logic circuits 160 in communication with line-of-sight locator 120, one or more of the objects 180, and one or more of the transparent displays 150. In some examples, logic circuits 160 may also be in communication with UWB anchors 140 depending on whether UWB tags 125, UWB anchors 140, or both are in communication with and providing position information to logic circuit 160. In some examples, multiple transparent displays 150 may be controlled by multiple logic circuits 160. In some examples, a single logic circuit 160 may control multiple transparent displays 150.

A user may enter a museum and may have or be provided a wearable line-of-sight locator 120, which may include one or more UWB tags 125 and may additionally include one or more additional sensors 130 as described above. User may calibrate wearable line-of-sight locator 120 to establish a baseline position for user's head 110 while looking straight forward. As a user moves through the three-dimensional space of the museum, which may have multiple levels, the user's head 110 position within the three-dimensional space is periodically determined as described above. The one or more logic circuits may determine a line-of-sight 170, a field-of-view 175, or both. With this information, the one or more logic circuits 160 may determine that user's head 110 is likely facing toward an object 180 on the other side of a transparent display 150. Logic circuit 160 may then determine a line-of-sight from the user's head 110 to the object through the transparent display 150. Logic circuit 160 may then instruct transparent display 150 to display object information 187 about object 180 as described above, immediately below the user's line-of-sight approximated by the line-of-sight 170. Line of sight display system 100 may include a connection to the Internet to receive content for object information 187 to be displayed on transparent display 150.

Line of sight display system 100 may include a logic circuit 160 to receive information from UWB anchors 140 regarding the timing of UWB signals between the one or more UWB tags 125 and UWB anchors 140. Logic circuit 160 may then use triangulation techniques to determine the relative position of user's head 110 within the three-dimensional space. The logic circuit 160 may also receive information regarding the relative positions of a transparent display 150 and an object 180, whether those positions are physically measured or they are determined from UWB data. With this information, logic circuit 160 may determine a line-of-sight 170 from the user's head 110 to the object 180 through the transparent display 150. By assuming that user is looking straight ahead relative to user 110's head position, line-of-sight 170 may be used to approximate the relative direction user is looking. In some examples, line-of-sight 170 may be used to determine a field-of-view 175.

In some examples, wearable line-of-sight locator 120 may include two or more UWB tags 125. Logic circuit 160 may receive calibration information regarding the relative positions of each UWB transceiver 125 when the user is sitting or standing straight and looking straight forward. Then, logic circuit 160 may periodically receive position information for each UWB transceiver 125 while the user moves within or through a three-dimensional space. Logic circuit 160 may periodically determine the relative positions of each UWB transceiver 125. With this information, logic circuit 160 may determine relative angles of pitch and roll for user's head 110. Logic circuit 160 may use this information to determine or adjust line-of-sight 170 and field-of-view 175. In some examples, the relative position of the user's head 110 within a three-dimensional space can similarly be determined by using a single UWB transceiver 125. One or more additional sensors 130 may be used to provide information to logic circuit 160 to determine relative angles of pitch and roll for the user's head 110. For example, additional sensors 130 may include one or more gyroscopic sensor to provide information on the relative pitch or roll. In some examples, additional sensor 130 may include one or more accelerometers to provide information on the movement of user's head 110. Additional sensors 130 may be calibrated, similar to UWB tags 125, to further inform the position of the user's head 110 (whether the user is sitting or standing straight, looking straight forward, or looking to the side, without limitation). Logic circuit 160 may use the information received from the one or more additional sensors 130 to determine or adjust line-of-sight 170 and field-of-view 175.

Logic circuit 160 may use line-of-sight 170 or field-of-view 175 to determine one or more objects 180 at which the user's head 110 may be facing. Logic circuit 160 may instruct transparent display 150 to display object information 187, e.g., information regarding object 180, in proximity to the intersection of line-of-sight 170 and transparent display 150 or within field-of-view 175. The same process may be used for other objects 180.

Figure 2:
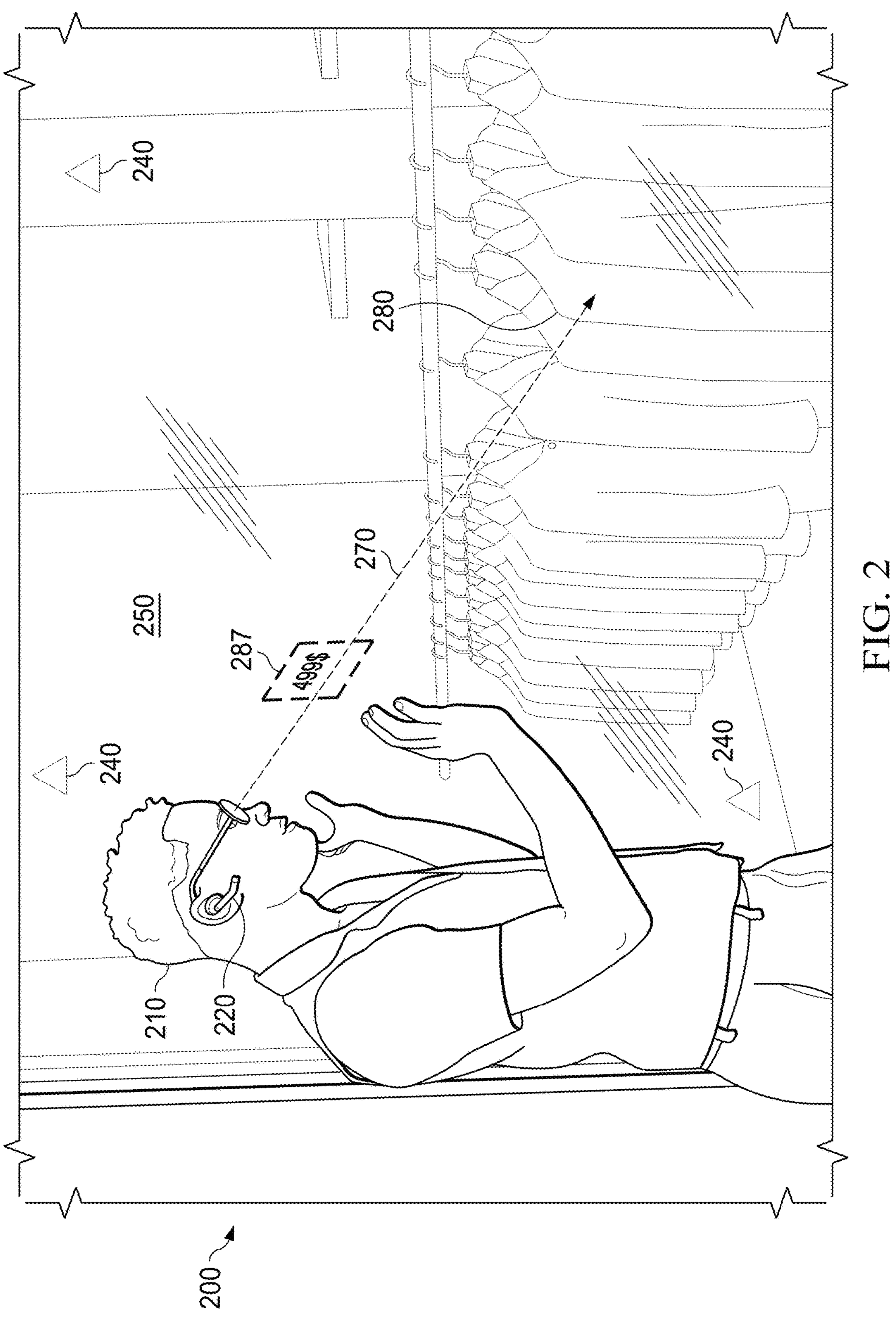
FIG. 2 shows an example of line-of-sight display system implemented in a shopping center.

FIG. 2 illustrates an example of line-of-sight display system 200 implemented in a shopping center, wherein a user is looking through a storefront window at retail objects behind the window. The storefront window is a transparent display 250. The user has a wearable line-of-sight locator 220 in his car in the form of an earbud. UWB anchors 240 may be located on both sides of the storefront window (transparent display 250) and UWB transceivers (anchors 240) may be associated with objects 280 within the store, in this case articles of clothing. A logic circuit 160 (see FIG. 1) may determine a line-of-sight 270 or field-of-view 275 from the user's head based on data from line-of-sight locator 220 and one or more objects 280 (article of clothing) at which the user's head 210 may be facing. Logic circuit 160 (see FIG. 1) may instruct transparent display 250 (window) to display object information 187, e.g., information regarding an object 280 (article of clothing), in proximity to the intersection of line-of-sight 270 and the transparent display 250 or within the field-of-view 275. The same process may be used for other objects 280.

Figure 3:
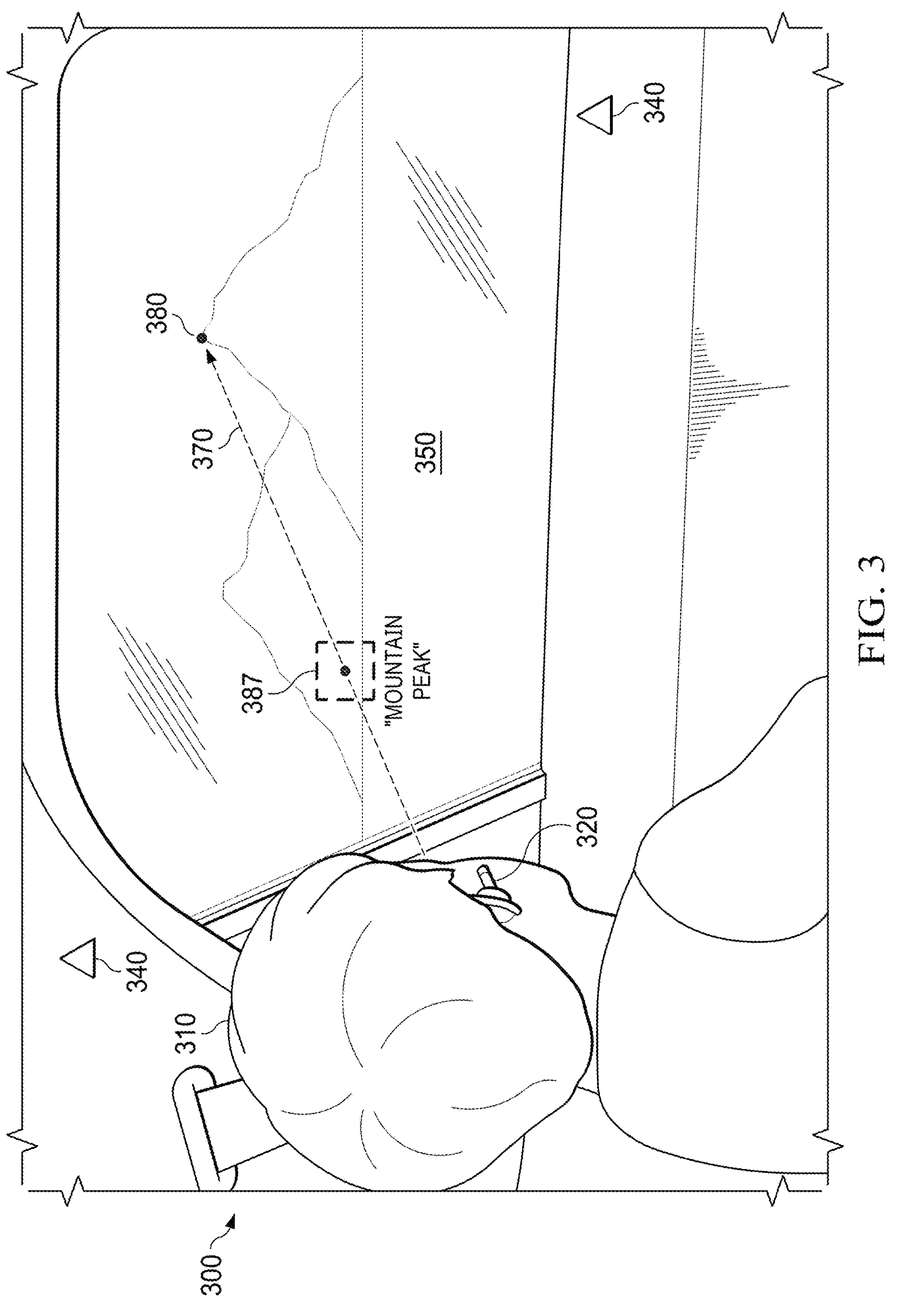
FIG. 3 shows an example of line-of-sight display system implemented in a vehicle.

FIG. 3 illustrates an example of line-of-sight display system 300 implemented in a vehicle (for example, a car), wherein a user is looking through a transparent display 350 (car window) at landscape objects 380 outside the vehicle. In the examples of vehicles, line-of-sight display system 300 may also include fixed exterior facing cameras to identify objects 380 of potential interest to a user. A camera may be used to identify positions of objects 380 outside the transparent display 350 (car window). Such cameras may not present the same concerns as described above regarding cameras worn or held by individual users. Transparent display 350 may be in the form of a window in the vehicle that user may look through. A logic circuit 160 (see FIG. 1) may determine a line-of-sight 370 or field-of-view (not indicated) from the user's head 310 based on data from line-of-sight locator 320 and one or more objects 380 (mountain peak) at which the user's head 310 may be facing. Logic circuit 160 (see FIG. 1) may instruct transparent display 350 (window) to display object information 387, e.g., information regarding an object 380 (mountain peak), in proximity to the intersection of line-of-sight 370 and the transparent display 350 or within a field-of-view (not indicated). The same process may be used for other objects 380.

Other examples of three-dimensional spaces suitable for a line-of-sight display system may include, without limitation, aquariums, zoos, and other vehicles such as trains, buses, and airplanes.

Figure 4:
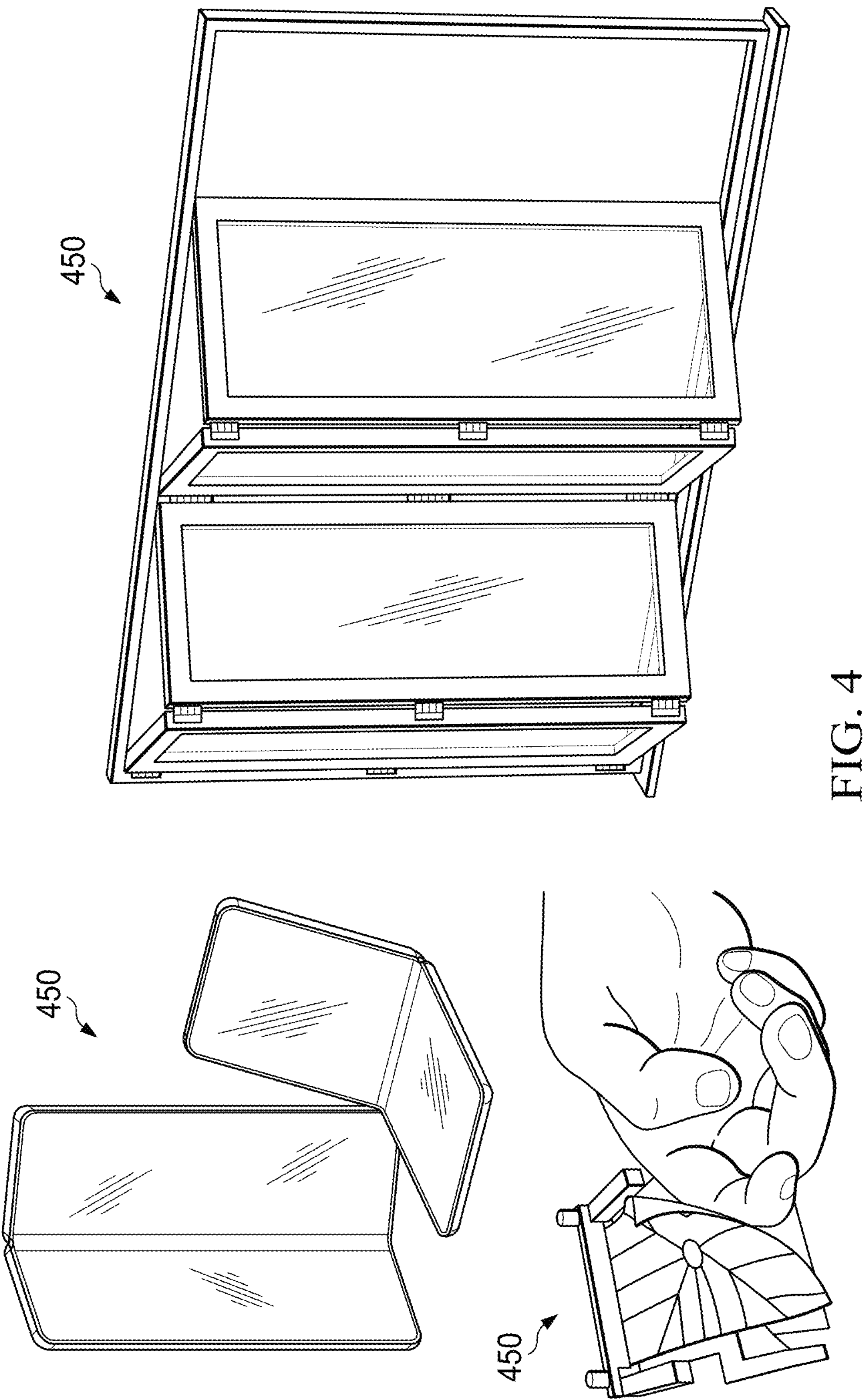
FIG. 4 shows examples of flexible and foldable LED display technologies, including transparent LED screens.

FIG. 4 illustrates examples of flexible and foldable LED display technologies, including transparent LED screens. In some examples, transparent display 450 may be a portable augmented reality capable display. Examples may include foldable or rollable clear LCD displays. In this case, user may take their own transparent display 150 with them into a three-dimensional space, e.g., a vehicle. The transparent display 450 may be a lens or lenses in a frame worn by a user (glasses).

Wearable line-of-sight locator may be a light-weight, wearable device, e.g., an earbud type device, may be fitted with a UWB transceiver to provide information about the position of a user's head, which may be used to approximate the direction the user's eyes are looking, relative to a transparent, augmented reality capable display. Visible objects behind the display can be highlighted by messages, annotations, or other information shown on the display specifically for that user's eyes, which are aligned with the display highlights and the objects behind the display.

The aspects described herein can be used in the following example contexts, without limitation. Passengers in vehicles, e.g., planes, trains, cars, or buses, without limitation, looking through a window or portable augmented reality display that indicates information about objects at which the user is looking. Applications where there are objects of interest (moving or static) behind a large glass wall or window include for example: industrial facilities, shopping centers, museums, zoos, and aquariums, without limitation. Inventions described herein may be used to track positions of users and of dynamic objects. In the case of dynamic scenery, the transparent display also communicates with an image recognition camera that observes what the user sees, so that visible objects can be highlighted on the transparent display specifically for the user's eyes. Examples may include zoos or aquariums where animals are the objects of interest and they are moving around within a determined three-dimensional space. By including additional UWB transceivers on the dynamic objects, the positions of the objects relative to users can be determined in the same way the position of users is determined and described herein. In the case of static scenery, the object locations relative to the display can be predetermined and hard-coded in the display's controller/software.

Examples of augmented reality capable displays may include transparent LCD displays and image projection displays, e.g., similar to a head up display (HUD) on the windshield of a vehicle. The systems described herein may include UWB or other RF transceivers used to determine the relative position of a user within a three-dimensional space and the approximate direction the user is looking. A processor, microcontroller, or other similar logic circuitry, may be used to determine an line-of-sight for the user and to highlight a location on the AR display with information about an object in the user's field-of-view (based on both the objects that are present and user's head position).

In some examples the wearable device may be in the form of an earbud. Advantages of such an implementation may include: fitted on head (moves/rotates the same as the head); stays in the same place on the head (same ear).

Figure 5:
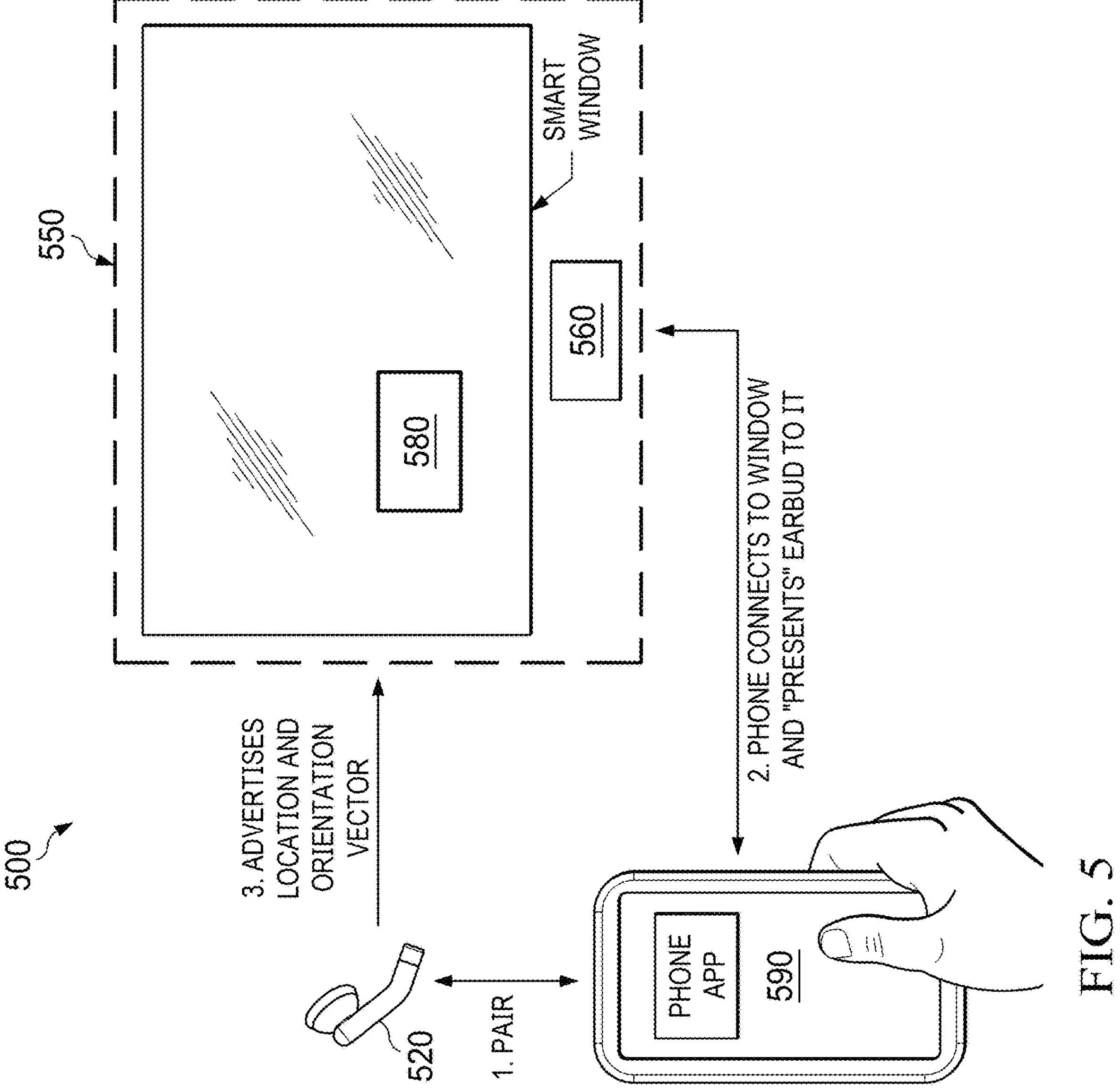
FIG. 5 shows the use of a handheld computing device incorporated in a line-of-sight display system.

FIG. 5 illustrates the use of a handheld computing device with line-of-sight display system 500. In some examples, a handheld computing device 590 may be used as part of the system 500 to facilitate communications between different components or to perform some or all functions of logic circuit 160 (see FIG. 1). For example, a user calibrates a wearable line-of-sight locator 520 to the user's head position while looking straight ahead. The user pairs the handheld computing device 590 with the wearable line-of-sight locator 520 and a transparent display 550 or smart window through conventional device pairing methods (may include near field communication (NFC)). In some examples, the pairing process between the wearable line-of-sight locator 520 and the transparent display 550 or smart window may be facilitated by the handheld computing device 590 to which the wearable line-of-sight locator 520 pairs (one time) and which in term connects to the transparent display 550 or smart window through a wireless interface (BLE, WiFi, NFC, without limitation) and uses a dedicated application to manage the connection. The handheld computing device 590 and application may be used to calibrate or test the other components. A logic circuit 560 may be found in either the line-of-sight locator 520, the transparent display 550, the handheld computing device 590, or a combination of the components.

The logic circuit 560 may be configured to receive augmented information via a camera feed (including objects location in the image frame(s)) of scenery. The logic circuit 560 may be configured to receive UWB data from the line-of-sight locator 520 as well as three-dimensional location (and orientation, if the line-of-sight locator 520 has two UWB antennas) to determine the position of the line-of-sight locator 520 through triangulation. The logic circuit 560 may determine the position of the user's eyes based on the calibration. The logic circuit 560 may calculate the location of the object 580 to highlight depending on a direction the user's head is pointing, wherein the logic circuit 560 may highlight the object 580 toward which the user is looking. However, given that the eyes' location is the same (even though the pupils may have moved), the object highlight(s) is still in alignment with them. Further, the transparent display 550 can also highlight several objects simultaneously, thus covering the full field-of-view.

In some examples, the wearable line-of-sight locator 520 may comprise two earbuds, each fitted with its own UWB antenna. The calculated three-dimensional location of eyes can be a virtual point in space placed exactly between the eyes. Assuming the handheld computing device 590 is connected to both earbuds of the line-of-sight locator 520 and is connected to the transparent display 550 while it highlights objects 580 for the user, the logic circuit 560 may receive live data feed from: the user (voice interaction), screen (highlighted object information), other sensors of the handheld computing device, e.g., GPS (location tracking), and the internet. The use of a handheld computing device 590 with the systems described herein can take into consideration the exchange of data with an online/offline LLM (Large Language model) to chat with the user. For example, while seated in a moving car, a user talks with Chat GPT about a mountain peak that he's looking at and it is highlighted on the transparent display 550.

The systems described herein may provide, without limitation: small size and light weight, seamless experience (no wearing discomfort), longer battery life, not intrusive to other people near the user, adaptable to many contexts, compatibility with other augmented reality applications, allows a user to see and highlight objects through a normal looking window (natural experience), easy for the eyes (no lens to wear), handsfree, and relatively inexpensive to the user.

Figure 6:
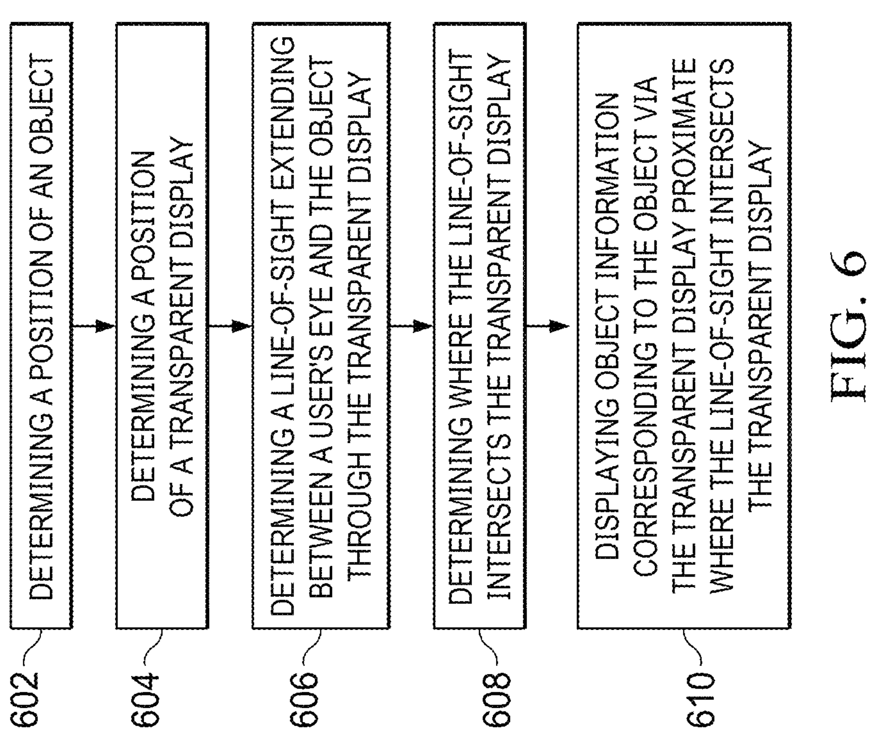
FIG. 6 shows a flow chart of a method to track a user's line-of-sight relative to objects through a transparent LCD display to provide information about the objects to be displayed on the display proximate the line-of-sight between the object being viewed and the user's head to create an augmented reality environment for the user.

FIG. 6 shows a flow chart of a method to track a user's line-of-sight relative to objects through a transparent LCD display to provide information about the objects to be displayed on the display proximate the line-of-sight between the object being viewed and the user's head to create an augmented reality environment for the user. A position of an object is determined 602. A position of a transparent display is determined 604. A line-of-sight is determined 606 extending between a user's eye and the object through the transparent display. A point where the line-of-sight intersects the transparent display is determined 608. Object information is displayed 610 corresponding to the object via the transparent display proximate where the line-of-sight intersects the transparent display.

Figure 7:
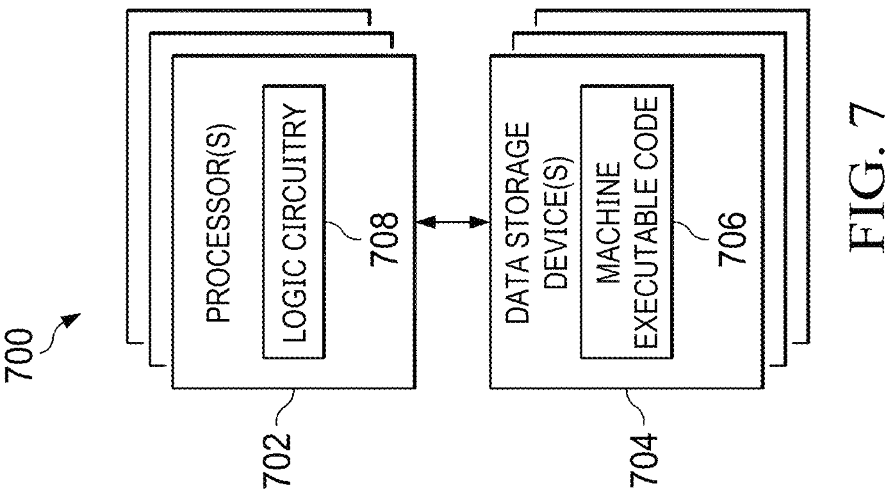
FIG. 7 is a block diagram of logic circuit that may be used to implement various functions, operations, acts, processes, and/or methods disclosed herein.

FIG. 7 is a block diagram of logic circuit 700 that, in some aspects, may be used to implement various functions, operations, acts, processes, and/or methods disclosed herein. The logic circuit 700 includes one or more processors 702 (sometimes referred to herein as "processors 702") operably coupled to one or more data storage devices (sometimes referred to herein as "storage 704"). The storage 704 includes machine executable code 706 stored thereon and the processors 702 include logic circuitry 708. The machine executable code 706 includes information describing functional elements that may be implemented by (e.g., performed by) the logic circuitry 708. The logic circuitry 708 is adapted to implement (e.g., perform) the functional elements described by the machine executable code 706. The logic circuit 700, when executing the functional elements described by the machine executable code 706, may be considered as specific purpose hardware configured for carrying out functional elements disclosed herein. In some aspects the processors 702 may perform the functional elements described by the machine executable code 706 sequentially, concurrently (e.g., on one or more different hardware platforms), or in one or more parallel process streams.

When implemented by logic circuitry 708 of the processors 702, the machine executable code 706 adapts the processors 702 to perform operations of aspects disclosed herein. For example, the machine executable code 706 may adapt the processors 702 to perform at least a portion or a totality of the augmented reality method of FIG. 6. As another example, the machine executable code 706 may adapt the processors 702 to perform at least a portion or a totality of the operations discussed for the logic circuits of FIGS. 1-3 and 5. As a specific, non-limiting example, the machine executable code 706 may adapt the processors 702 to perform at least a portion of the augmented reality operations discussed herein.

The processors 702 may include a general purpose processor, a specific purpose processor, a central processing unit (CPU), a microcontroller, a programmable logic controller (PLC), a digital signal processor (DSP), an application specific integrated circuit (ASIC), a field-programmable gate array (FPGA) or other programmable logic device, discrete gate or transistor logic, discrete hardware components, other programmable device, or any combination thereof designed to perform the functions disclosed herein. A general-purpose computer including a processor is considered a specific-purpose computer while the general-purpose computer is configured to execute functional elements corresponding to the machine executable code 706 (e.g., software code, firmware code, hardware descriptions) related to aspects of the present disclosure. It is noted that a general-purpose processor (may also be referred to herein as a host processor or simply a host) may be a microprocessor, but in the alternative, the processors 702 may include any conventional processor, controller, microcontroller, or state machine. The processors 702 may also be implemented as a combination of computing devices, such as a combination of a DSP and a microprocessor, a plurality of microprocessors, one or more microprocessors in conjunction with a DSP core, or any other such configuration.

In some aspects the storage 704 includes volatile data storage (e.g., random-access memory (RAM)), non-volatile data storage (e.g., Flash memory, a hard disc drive, a solid state drive, erasable programmable read-only memory (EPROM), without limitation). In some aspects the processors 702 and the storage 704 may be implemented into a single device (e.g., a semiconductor device product, a system on chip (SOC), without limitation). In some aspects the processors 702 and the storage 704 may be implemented into separate devices.

In some aspects the machine executable code 706 may include computer-readable instructions (e.g., software code, firmware code). By way of non-limiting example, the computer-readable instructions may be stored by the storage 704, accessed directly by the processors 702, and executed by the processors 702 using at least the logic circuitry 708. Also by way of non-limiting example, the computer-readable instructions may be stored on the storage 704, transferred to a memory device (not shown) for execution, and executed by the processors 702 using at least the logic circuitry 708. Accordingly. in some aspects the logic circuitry 708 includes electrically configurable logic circuitry 708.

In some aspects the machine executable code 706 may describe hardware (e.g., circuitry) to be implemented in the logic circuitry 708 to perform the functional elements. This hardware may be described at any of a variety of levels of abstraction, from low-level transistor layouts to high-level description languages. At a high-level of abstraction, a hardware description language (HDL) such as an IEEE Standard hardware description language (HDL) may be used. By way of non-limiting examples, Verilog™, System Verilog™ or very large scale integration (VLSI) hardware description language (VHDL™) may be used.

HDL descriptions may be converted into descriptions at any of numerous other levels of abstraction as desired. As a non-limiting example, a high-level description can be converted to a logic-level description such as a register-transfer language (RTL), a gate-level (GL) description, a layout-level description, or a mask-level description. As a non-limiting example, micro-operations to be performed by hardware logic circuits (e.g., gates, flip-flops, registers, without limitation) of the logic circuitry 708 may be described in a RTL and then converted by a synthesis tool into a GL description, and the GL description may be converted by a placement and routing tool into a layout-level description that corresponds to a physical layout of an integrated circuit of a programmable logic device, discrete gate or transistor logic, discrete hardware components, or combinations thereof. Accordingly, in some aspects, the machine executable code 706 may include an HDL, an RTL, a GL description, a mask level description, other hardware description, or any combination thereof.

In aspects where the machine executable code 706 includes a hardware description (at any level of abstraction), a system (not shown, but including the storage 704) may be configured to implement the hardware description described by the machine executable code 706. By way of non-limiting example, the processors 702 may include a programmable logic device (e.g., an FPGA or a PLC) and the logic circuitry 708 may be electrically controlled to implement circuitry corresponding to the hardware description into the logic circuitry 708. Also, by way of non-limiting example, the logic circuitry 708 may include hard-wired logic manufactured by a manufacturing system (not shown, but including the storage 704) according to the hardware description of the machine executable code 706.

Regardless of whether the machine executable code 706 includes computer, readable instructions or a hardware description, the logic circuitry 708 is adapted to perform the functional elements described by the machine executable code 706 when implementing the functional elements of the machine executable code 706. It is noted that although a hardware description may not directly describe functional elements, a hardware description indirectly describes functional elements that the hardware elements described by the hardware description are capable of performing.

Although examples have been described above, other variations and examples may be made from this disclosure without departing from the spirit and scope of these disclosed examples.

The invention claimed is:

1. A method comprising:

determining a position of an object by analyzing first ultra-wideband radio pulses between an ultra-wideband tag associated with the object and a plurality of ultra-wideband anchors to assign coordinates of the ultra-wideband tag associated with the object within a three-dimensional coordinate system;

determining a position of a transparent display by analyzing second ultra-wideband radio pulses between an ultra-wideband tag associated with the transparent display and the plurality of ultra-wideband anchors to assign coordinates of the ultra-wideband tag associated with the transparent display within the three-dimensional coordinate system;

determining a position of the user's eye by analyzing third ultra-wideband radio pulses between an ultra-wideband tag associated with the user's eye and the plurality of ultra-wideband anchors to assign coordinates of the ultra-wideband tag associated with the user's eye within the three-dimensional coordinate system;

determining a line-of-sight extending between a user's eye and the object through the transparent display;

determining where the line-of-sight intersects the transparent display; and displaying object information corresponding to the object via the transparent display proximate where the line-of-sight intersects the transparent display.

2. The method as in claim 1, wherein determining a position of the user's eye comprises determining the user's eye position relative to the transparent display.

3. The method as in claim 1, comprising determining a direction a user's head is facing.

4. The method as in claim 1, wherein determining a line-of-sight comprises:

assigning coordinates to the object within a three-dimensional coordinate system;

assigning coordinates to the user's eye within a three-dimensional coordinate system; and extending the line-of-sight between the coordinates assigned to the object and the coordinates assigned to the user's eye.

5. A system comprising:

a tag associated with a position of an object to transmit a tag location radio pulse, wherein the tag comprises ana first ultra-wideband transmitter;

a line-of-sight locator associated with a user's eye to transmit a line-of-sight location radio pulse, wherein the line-of-sight locator comprises a second ultra-wideband transmitter;

a transparent display to display object information corresponding to the object, wherein the transparent display is positioned between the tag and the line-of-sight locator;

a fixed anchor to receive the tag location radio pulse and the line-of-sight location radio pulse, wherein the anchor comprises an ultra-wideband receiver; and a logic circuit in communication with the transparent display and the anchor configured to:

determine a line-of-sight extending between the user's eye and the object through the transparent display;

determine where the line-of-sight intersects the transparent display; and instruct the transparent display to display the object information proximate where the line-of-sight intersects the transparent display.

6. The system as in claim 5, wherein the logic circuit is to assign coordinates to the tag and the line-of-sight locator, respectively, within a three-dimensional coordinate system.

7. The system as in claim 5, wherein the transparent display is wearable by the user.

8. The system as in claim 5, wherein the line-of-sight locator is wearable by the user.

9. The system as in claim 5, wherein the line-of-sight locator comprises first and second wearable ultra-wideband devices to transmit first and second line-of-sight location radio pulses, respectively, wherein the anchor is to receive the first and second line-of-sight location radio pulses; and wherein the logic circuit is configured to determine a direction a user's head is facing.

10. The system as in claim 5, comprising a handheld computing device to communicate with the logic circuit, wherein the handheld computing device communicates information related to the object for the logic circuit to instruct the transparent display to display.

11. A logic circuit configured to:

process a location radio pulse of an ultra-wideband tag associated with a position of an object;

process a line-of-sight location radio pulse of a line-of-sight ultra-wideband locator associated with a user's eye;

determine a line-of-sight extending between the user's eye and the object through a transparent display positioned between the tag and the line-of-sight ultra-wideband locator;

determine where the line-of-sight intersects the transparent display; and instruct the transparent display to display object information corresponding to the object proximate where the line-of-sight intersects the transparent display.

12. The logic circuit as in claim 11, wherein the logic circuit is configured to assign coordinates to the object and the line-of-sight ultra-wideband locator, respectively, within a three-dimensional coordinate system.

13. The logic circuit as in claim 12, wherein the logic circuit is configured to:

extend the line-of-sight between the coordinates assigned to the object and the coordinates assigned to the user's eye, within the three-dimensional coordinate system; and determine where the line-of-sight intersects the transparent display by assigning coordinates to where the line-of-sight intersects the transparent display, within the three-dimensional coordinate system.

14. The method as in claim 1, wherein the ultra-wideband tag associated with the user's eye comprises an earbud to be worn in the user's ear.

15. The method as in claim 1, wherein determining a position of an object comprises analyzing the ultra-wideband radio pulses by Time Difference of Arrival (TDoA) or Two-Way Ranging (TWR).

16. The method as in claim 1, wherein determining a position of a transparent display comprises analyzing ultra-wideband radio pulses by Time Difference of Arrival (TDoA) or Two-Way Ranging (TWR).

17. The method as in claim 1, wherein determining a position of the user's eye comprises analyzing ultra-wideband radio pulses by Time Difference of Arrival (TDoA) or Two-Way Ranging (TWR).

18. The system as in claim 5, wherein the logic circuit in communication with the transparent display and the anchor is configured to determine a line-of-sight analyzing ultra-wideband radio pulses by Time Difference of Arrival (TDoA) or Two-Way Ranging (TWR) determine where the line-of-sight intersects the transparent display.

19. The system as in claim 5, wherein the logic circuit in communication with the transparent display and the anchor is configured to determine where the line-of-sight intersects the transparent display by analyzing ultra-wideband radio pulses by Time Difference of Arrival (TDoA) or Two-Way Ranging (TWR).

20. The logic circuit as in claim 11, wherein the logic circuit is configured to process the location radio pulse and the line-of-sight location radio pulse by Time Difference of Arrival (TDoA) or Two-Way Ranging (TWR).

* * * * *